US00RE46801E

(19) United States
(12) Reissued Patent
Sohn et al.

(10) Patent Number: US RE46,801 E
(45) Date of Reissued Patent: Apr. 24, 2018

(54) PORTABLE COMPUTER

(71) Applicant: Samsung Electronics Co., Ltd., Suwon-si (KR)

(72) Inventors: Donghoon Sohn, Seoul (KR); Anders P. Jensen, Charlottenlund (DK)

(73) Assignee: SAMSUNG ELECTRONICS CO., LTD., Suwon-si (KR)

(21) Appl. No.: 29/556,468

(22) Filed: Mar. 1, 2016

Related U.S. Patent Documents

Reissue of:
(64) Patent No.: Des. 723,540
Issued: Mar. 3, 2015
Appl. No.: 29/473,116
Filed: Nov. 19, 2013

U.S. Applications:
(63) Continuation of application No. 29/556,105, filed on Feb. 26, 2016, which is an application for the reissue of Pat. No. Des. 723,540.

(30) Foreign Application Priority Data

May 30, 2013 (KR) ..... 30-2013-0028189

(51) LOC (11) Cl. ..... 14-02
(52) U.S. Cl.
USPC ..... D14/315
(58) Field of Classification Search
USPC ..... D14/315–327; D18/2, 7, 11
(Continued)

(56) References Cited

U.S. PATENT DOCUMENTS 5,987,704 A 11/1999 Tang
6,223,393 B1 * 5/2001 Knopf ..... G06F 1/1681 16/366

(Continued)

*Primary Examiner* — Phillip S Hyder
(74) *Attorney, Agent, or Firm* — McAndrews Held & Malloy, Ltd.

(57) CLAIM

The ornamental design for a portable computer, as shown and described.

DESCRIPTION

*Notice: More than one reissue application has been filed for the reissue of U.S. Pat. No. D723,540. The reissue applications are application Ser. Nos. 29/556,105, which is an application for reissue of U.S. Pat. No. D723,540; 29/556,459 and 29/556,468, which are each a continuation reissue of application Ser. No. 29/556,105; and 29/581,288, which is a divisional reissue of application Ser. No. 29/556,105.*

FIG. 1 is a top front perspective view of a portable computer showing our new design;
FIG. 2 is a front view thereof;
FIG. 3 is a rear view thereof;
FIG. 4 is a [side view thereof] *left-side view thereof*;
FIG. 5 is [another side view thereof] *a right-side view thereof*;
FIG. 6 is a top view thereof;
FIG. 7 is a bottom view thereof; [and,]
FIG. 8 is another top front *perspective* view thereof, with the portable computer shown in an open position[.]; *and*
*FIG. 9 is an enlarged view of the portion encircled in FIG. 1; and,*
*FIG. 10 is an enlarged view of the portion encircled in FIG. 5.*

[The broken lines illustrating portions of the portable computer are for environmental purposes only and form no part of the claimed design.]
*The dashed broken lines in the drawings illustrate portions of the portable computer that form no part of the claimed design.*

(Continued)

(AMENDED)

*The dot-dash broken lines in the drawings encircle portions of the claimed design that are illustrated in enlargements and form no part of the claimed design.*

1 Claim, 5 Drawing Sheets

Matter enclosed in heavy brackets [ ] appears in the original patent but forms no part of this reissue; matter printed in italics indicates the additions made by reissue.

(58) Field of Classification Search
CPC ... G06F 1/166; H04M 1/0214; H04M 1/0216; H04M 1/0237
See application file for complete search history.

(56) References Cited

U.S. PATENT DOCUMENTS 6,421,235 B2 * 7/2002 Ditzik ..... G06F 1/1616 320/114
6,480,373 B1 * 11/2002 Landry et al. ..... 361/679.06
D488,807 S * 4/2004 Ogasawara ..... D14/318
D551,640 S * 9/2007 Wolf ..... D14/138 AB
D591,283 S * 4/2009 Luminosu et al. ..... D14/318
7,532,916 B2 * 5/2009 Lee ..... H04M 1/0216 379/433.13
8,170,630 B2 * 5/2012 Murayama ..... H04M 1/022 16/330
8,194,399 B2 * 6/2012 Ashcraft ..... G06F 1/1626 257/59
D664,953 S * 8/2012 Hung ..... D14/327
D675,199 S * 1/2013 Wen et al. ..... D14/315
D682,818 S * 5/2013 Morisawa ..... D14/315
D705,221 S * 5/2014 Hong ..... D14/315
2006/0002068 A1 * 1/2006 Kim ..... G06F 1/1616 361/679.27
2007/0117600 A1 * 5/2007 Robertson, Jr. ..... H04M 1/0216 455/575.3
2008/0300031 A1 * 12/2008 Cho ..... H04M 1/0216 455/575.3
2010/0232100 A1 * 9/2010 Fukuma ..... F16G 13/18 361/679.01

* cited by examiner

FIG.1
(AMENDED)
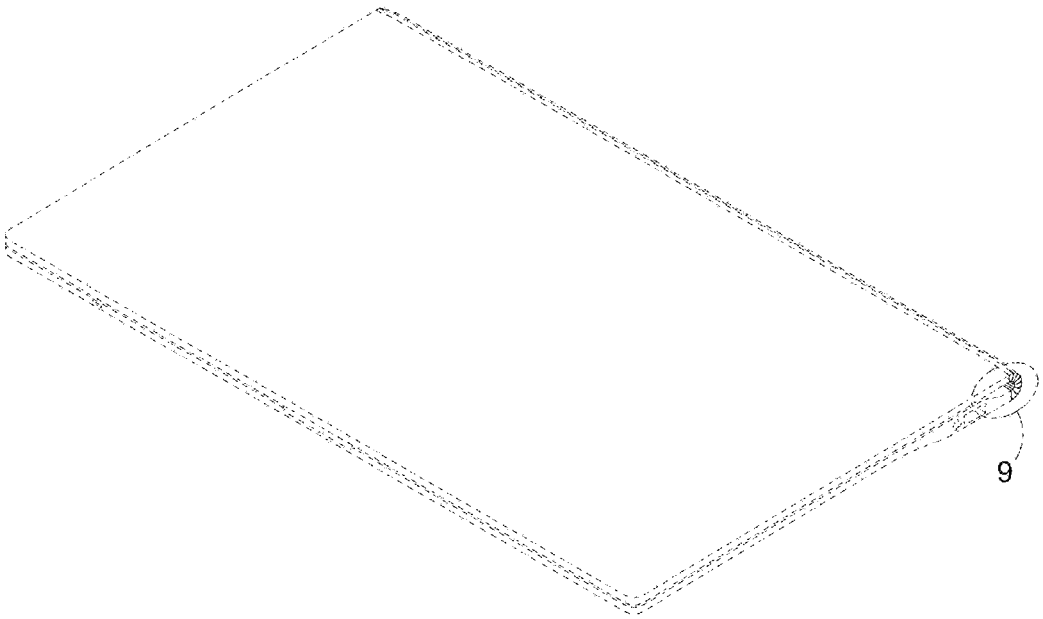

FIG.2
(AMENDED)
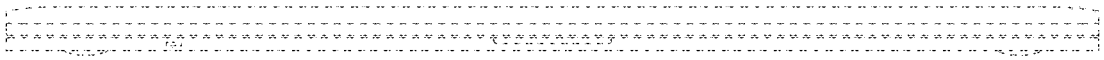
FIG.3
(AMENDED)
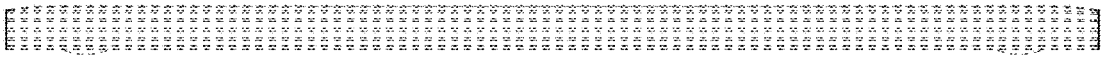
FIG.4
(AMENDED)
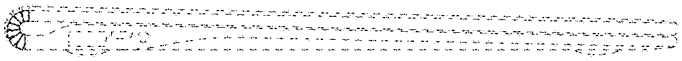
FIG.5
(AMENDED)
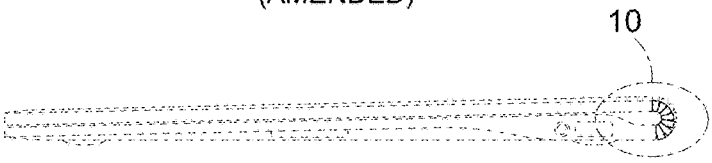

FIG.6
(AMENDED)
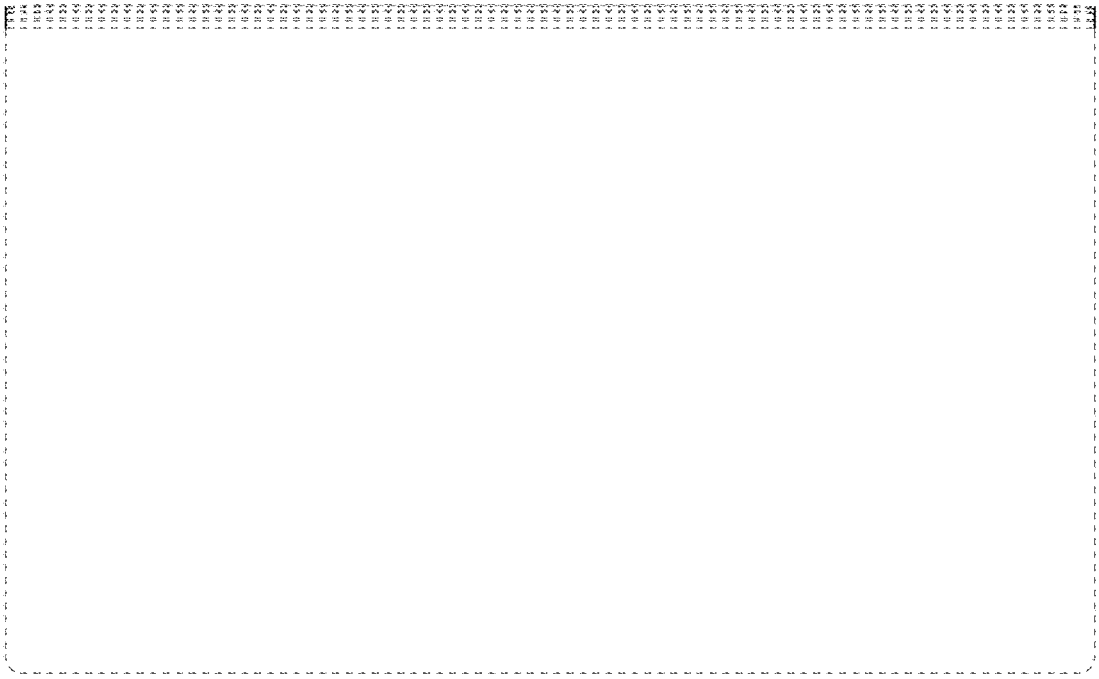
FIG.7
(AMENDED)
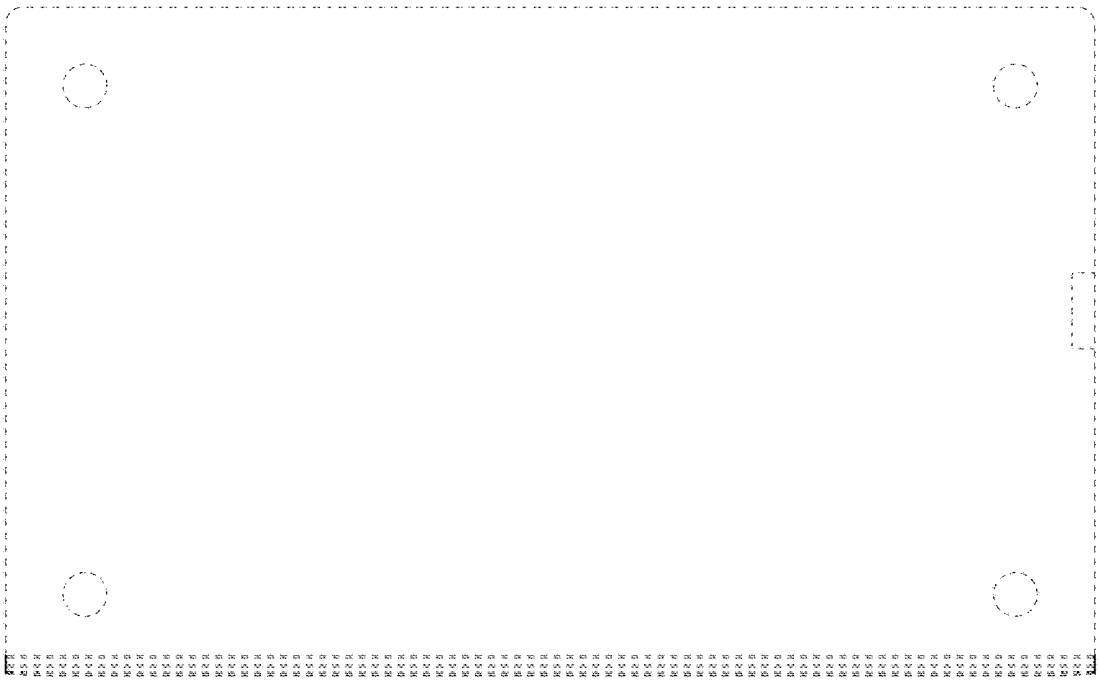

FIG.8
(AMENDED)
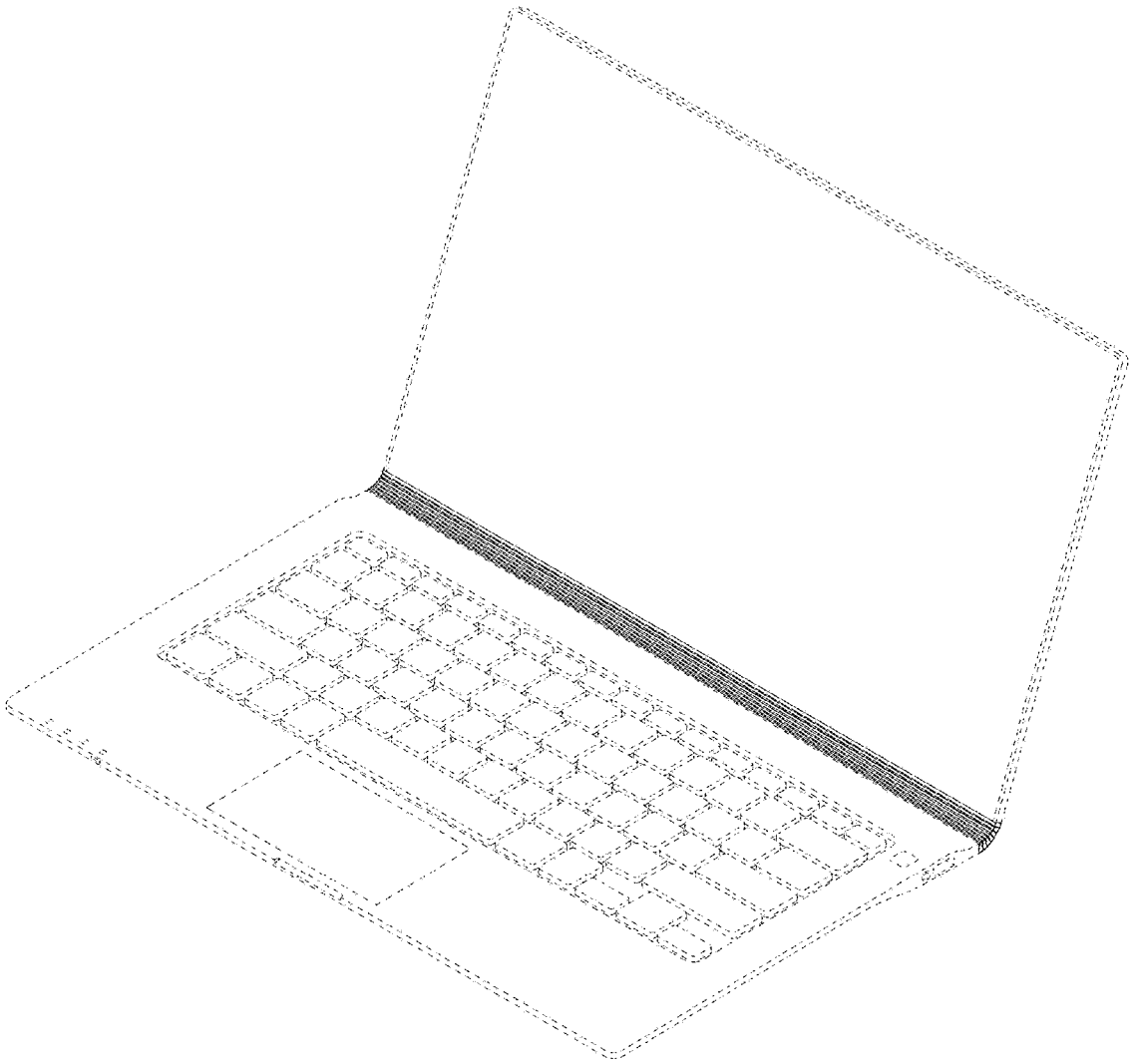

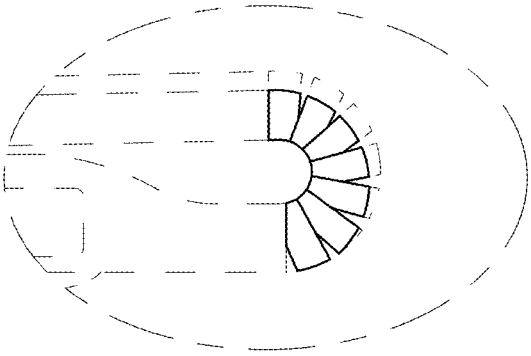

FIG.9
(NEW)
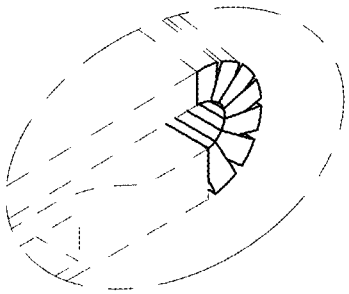
FIG.10
(NEW)